(12) United States Patent
Radl et al.

(10) Patent No.: US 7,244,800 B2
(45) Date of Patent: Jul. 17, 2007

(54) REDUCTION OF COEFFICIENT OF FRICTION FOR THERMAL ADDITION CURABLE SOLVENTLESS SILICONE RELEASE COATING SYSTEMS

(75) Inventors: Michael D. Radl, Rock Hill, SC (US); James G. Ellison, Chester, SC (US); Nolan R. Stewart, Catawba, SC (US)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 11/008,686

(22) Filed: Dec. 9, 2004

(65) Prior Publication Data

US 2005/0129963 A1    Jun. 16, 2005

Related U.S. Application Data

(60) Provisional application No. 60/529,195, filed on Dec. 12, 2003.

(51) Int. Cl.
  *C08G 77/08*   (2006.01)
(52) U.S. Cl. ............................. 528/15; 528/31; 528/32; 525/478
(58) Field of Classification Search .................. 528/15, 528/31, 32; 525/478
See application file for complete search history.

(56) References Cited

U.S. PATENT DOCUMENTS

| 3,419,593 | A |   | 12/1968 | Willing ................... 260/448.2 |
| 3,715,334 | A |   | 2/1973  | Karstedt .................... 260/46.5 |
| 4,526,953 | A | * | 7/1985  | Dallavia, Jr. .................. 528/15 |
| 4,753,978 | A | * | 6/1988  | Jensen ......................... 524/862 |
| 4,946,878 | A | * | 8/1990  | Jensen et al. ................ 523/213 |
| 5,006,580 | A | * | 4/1991  | Kasuya et al. ............... 524/264 |
| 5,432,006 | A | * | 7/1995  | Kessel et al. ............... 428/447 |
| 5,706,098 | A | * | 1/1998  | Clark et al. ................ 358/3.27 |
| 5,977,226 | A | * | 11/1999 | Dent et al. ................... 524/267 |

\* cited by examiner

*Primary Examiner*—Margaret G. Moore
(74) *Attorney, Agent, or Firm*—Buchanan, Ingersoll & Rooney, PC

(57) ABSTRACT

The invention is directed to a thermal addition curable solventless silicone release composition having a reduced coefficient of friction and improved slip characteristics. The invention is also directed to a method for producing a thermal addition curable solventless silicone release composition on a substrate by applying the thermal addition curable solventless release composition of the invention to a substrate and curing the coating on the substrate using heat. The invention is further directed to a thermal addition curable solventless silicone release coated article having a reduced coefficient of friction and improved slip characteristics.

18 Claims, No Drawings

REDUCTION OF COEFFICIENT OF FRICTION FOR THERMAL ADDITION CURABLE SOLVENTLESS SILICONE RELEASE COATING SYSTEMS

This patent application claims priority from U.S. provisional patent application Ser. No. 60/529,195 filed on Dec. 12, 2003.

FIELD OF THE INVENTION

The invention relates generally to silicone release coating compositions, the use of such silicone release coating compositions to coat a substrate, and a release coated substrate formed thereof. More particularly, the invention relates to thermal addition curable solventless silicone release coatings having a reduced coefficient of friction, improved slip/shear, and reduced backside transfer.

BACKGROUND OF THE INVENTION

Silicone release coatings or compositions are well known and the subject of many publications and patents. They are useful in many applications where one requires a relatively non-adherent surface. In such applications release compositions are coated onto a substrate, and are caused to be cured. A particularly useful application is the coating of paper, film, and other materials that are used among other applications by providing non-stick surfaces for pressure sensitive adhesive labels, decorative laminates, and transfer tapes.

Silicone release compositions have been used in large volumes for many years. Silicone polymers and copolymers have been used extensively in release compositions because they are inherently low in surface energy. The silicone polymers and copolymers (sometimes referred to as polyorganosiloxanes) used in the prior art for making release compositions can be radiation cured or thermally cured. In the beginning the silicone release composition of choice was the thermal solvent diluted condensation cured release coating system. Silicone technology has progressed from thermal condensation curable solvent-based release coating systems to thermal addition curable solvent-based release coating systems and then to thermal addition curable solventless release coating systems and radiation cured release coatings. The advantages of using solventless, radiation curable, or thermally curable release compositions are well known to the person skilled in the art of release coatings.

Thermal addition curable solventless compositions have become the dominant release coating compositions for delivering pressure sensitive adhesive products to the market place. These markets include pressure sensitive label, graphic arts, tapes, prepreg, and medical, to name a few. Accordingly, to be effective, a thermal addition curable solventless silicone release system must be versatile and meet minimum converter demands.

It is desirable that release coated papers and films have a release force which is low enough to enable the release backing sheet to be easily removed from the coated substrate, but not so low that the release backing sheet will become prematurely separated from the coated surface by forces normally encountered in handling and processing. "Release force" is defined as the amount of force required to peel or separate the release coated substrate from the adhesive or facing.

Conventional thermal addition curable solventless silicone release coatings have a high coefficient of friction compared to condensation curable solvent-based silicone release coatings. The higher coefficient of friction imparts a problematic characteristic referred to as "grab" wherein the coated substrate tends to stick or grab. Due to the differences in the both physical and functional chemistry between condensation curable solvent-based systems and thermal addition curable solventless systems, the thermal addition curable solventless system produces a tacky grabby feel as opposed to the waxy slippery feel of the condensation curable solvent system. It has been the desire of the Pressure Sensitive Adhesive (PSA) industry to have a thermal addition curable solventless system that gives the waxy slippery feel of a condensation curable solvent-based system.

In order to overcome the "grab" problem, associated with thermal addition curable solventless compositions, current technology uses very high molecular weight nonreactive polymers to reduce the coefficient of friction or grab. These high molecular weight polymers tend to bloom or migrate to the surface to impart additional slip however they also tend to cause converting problems.

During manufacture and storage of the coated sheets prior to use, the free nonreactive silicone oil that has bloomed to the surface is inevitably released from the coated sheet onto the surface of another coated or uncoated sheet leaving discrete patches of free nonreactive silicone oil on the sheet surface. When, for example, the coated sheet is stored in a front surface to back surface contact manner, as in a typical roll, some of the free nonreactive silicone oil (typically high molecular weight silicones) on the front silicone coated surface of the sheet will be transferred to the back (typically uncoated) surface of the roll.

In practice, this free nonreactive silicone oil contamination can be a drawback. For example, when the coated sheet traverses over idler rolls during subsequent processing steps (e.g., during label application), the idler rolls can develop a buildup. This can result in uneven tension on the sheet web or loss of alignment. Related problems arise when printing on the resulting release coated sheet or when labels are applied to the sheet. The ability of printing inks and solvents to adhere is impaired by the presence of free nonreactive silicone oil on the surface to be printed. Moreover, loss of alignment due to the sheet's slip characteristics can lead to a high reject rate during printing, particularly where multiple printing passes are used and in cases where proper alignment is critical for formation of an integrated image.

By having a thermal addition curable solventless system that produces a coefficient of friction similar to a condensation curable solvent-based system, a more complete cure off the coater will be achieved, thereby providing a more stable release coating when compared to thermal solvent condensation cured release coating systems.

Accordingly, there exists a need in the art to provide a thermal addition curable solventless silicone release composition with a lower coefficient of friction and lower slip. A need also exists to provide a thermal addition curable solventless silicone release compositions with similar slip and feel properties to a condensation curable solvent-based silicone release composition.

SUMMARY OF THE INVENTION

The invention is directed to a thermal addition curable solventless silicone release composition having a reduced coefficient of friction and improved slip characteristics.

A further aspect of the invention comprises a method for producing a thermal addition curable solventless silicone release composition on a substrate by applying the afore-described release composition to a substrate and curing the coating on the substrate. The coating is cured by exposing the coating to heat. A still further aspect of this invention comprises a thermal addition curable solventless silicone release coated article having a reduced coefficient of friction and improved slip characteristics comprising a substrate which has been coated with the solventless release composition of the invention and has been cured by exposure to heat.

DETAILED DESCRIPTION OF INVENTION AND PREFERRED EMBODIMENTS

Through a unique blend of thermal addition curable alkenyl polyorganosiloxane polymers, the invention provides a coating with a reduced coefficient of friction ("CoF") similar to that of a condensation curable solvent-based release coating composition but without the inherent problems of cure and performance. The composition of the invention contains no high molecular weight gums. The composition of the invention does not bloom or migrate to the surface to impart slip; rather the composition of the invention reacts into the cured matrix, which is very stable. It should be noted that the composition of the invention is highly reactive, thus providing a cure similar to those achieved by typical thermal addition curable solventless release coating compositions.

The composition of the invention imparts excellent anchorage, and stable release as typically exhibited by acrylic-based and rubber-based adhesive release compositions. The composition of the invention is also low in viscosity for ease of handling and use. The composition of the invention is also compatible with a many additives. The composition of this invention is applied by typical thermal solventless coating methods.

In the following detailed description, reference is made to various specific embodiments in which the invention may be practiced. These embodiments are described with sufficient detail to enable those skilled in the art to practice the invention, and it is to be understood that other embodiments may be employed, and that various chemical changes may be made without departing from the spirit or scope of the invention.

The basic coating formula is composed primarily of three components. The three components are 1) a base polymer, an alkenyl functional polyorganosiloxane polymer(s), 2) a organohydropolysiloxane functional crosslinker, either a homopolymer, copolymer or a blend of both, and 3) a hydrosilyation catalyst (see U.S. Pat. Nos. 3,419,593 and 3,715,334 "Karstedt catalysts").

In some instances, other additives can be added, such as controlled release additives, anchorage additives, or viscosity modifiers.

The invention is a thermal addition curable solventless silicone release coating composition, characterized in that it comprises, as a mixture:

(a) from about 0 to about 50 parts by weight of an organopolysiloxane of formula (I) wherein the Brookfield viscosity of formula (I) is about 50 cps to about 45,000 cps at room temperature, and is more preferably about 180 cps, and wherein n is from about 85 to about 115 and is more preferably about 97;

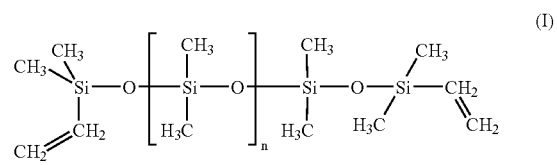

(b) from about 0 to about 25 parts by weight of formula (I) wherein the Brookfield viscosity of formula (I) is about 50,000 cps to about 150,000 cps and is more preferably about 100,000 cps, wherein n is from about 855 to about 1325 and is more preferably about 980;

(c) from 0 to about 50 parts by weight of formula (II) wherein the Brookfield viscosity of formula (II) is about 50 cps to about 50,000 cps and is more preferably about 450 cps, and wherein n is from about 115 to about 145 and is more preferably about 130, and wherein m is from about 1 to about 15 and is more preferably about 8;

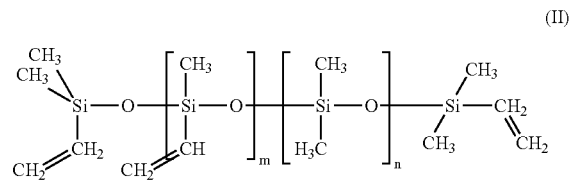

(d) from about 0 to about 15 parts of an alpha olefin having a general formula of $CH_2=CH-[CH_2]_a CH_3$, wherein a maybe from about 4 to about 20, and is preferably 11;

(e) from about 0 to about 15 parts of a crosslinkable polymer; and (f) from about 0 to about 10 parts of a platinum group based catalyst system.

The crosslinkable polymer may be any suitable polymer. Suitable crosslinkable polymers include, a homopolymer crosslinker having a general formula (III) or (IV) of for example:

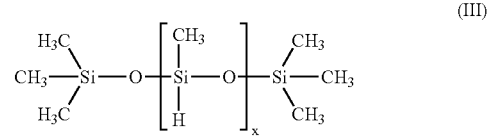

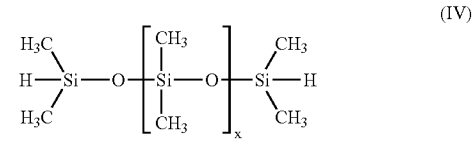

or a copolymer crosslinker having a general formula (V) or (VI) of for example:

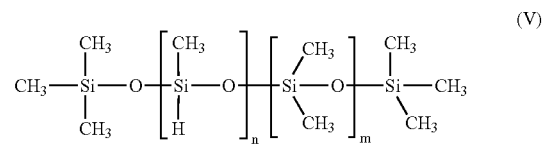

-continued

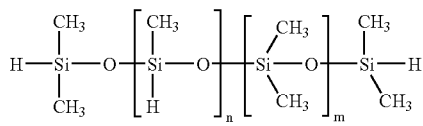

(VI)

The alpha olefin is generally used as a flow modification agent which serves to enhance or otherwise control the viscosity or flow-ability of the final composition. Accordingly, any suitable flow modification agent may be used.

The thermal addition curable solventless silicone release composition of the invention can also be stabilized against premature polymerization during storage by the addition of conventional polymerization inhibitors, such as hydroquinone, monomethylether of hydroquinone, phenothiazine, di-t-butyl paracresol, acetylenic alcohol, maleates, fumarates, and the like. Amounts of from about 0.1 to about 0.5 weight percent or less of the stabilizers are generally effective.

A more preferred thermal addition curable solventless release coating composition may comprise:
  (a) about 35 parts by weight of the organopolysiloxane of formula (I) wherein the Brookfield viscosity of formula (I) is about 50 cps to about 45,000 cps at room temperature, and is more preferably about 180 cps and wherein n is about 97;
  (b) about 15 parts by weight of formula (I) wherein the Brookfield viscosity of formula (I) is about 50,000 cps to about 150,000 cps and is more preferably about 100,000 cps, and wherein n is about 980;
  (c) about 40 parts by weight of formula (II) wherein the Brookfield viscosity of formula (II) is about 50 cps to about 50,000 cps and is more preferably about 450 cps, and wherein n is about 120 and m is about 8;
  (d) about 10 parts by weight of alpha olefin having a general formula of $CH_2=CH-[CH_2]_aCH_3$ wherein a is about 11; and
  (e) about 0.3 weight percent or less of diallyl maleate.

The thermal addition curable solventless silicone release compositions of the invention generally are applied to a substrate prior to curing. The compositions may be applied to a substrate as a coating by any conventional means known in the coating art, such as roller coating, curtain coating, brushing, spraying, reverse roll coating, doctor knife, direct gravure, offset gravure, multi-roll, dipping, die coating and the like.

A wide variety of substrates can be coated with the thermal addition curable solventless silicone release compositions of the invention. These compositions can be applied to any suitable substrate when it is desirable to modify the release properties of a surface of the substrate. For example, thermal addition curable solventless silicone release compositions are widely used in the graphic arts sheet label market. The thermal addition curable solventless silicone release compositions of the invention applied to the various substrates will vary depending upon the characteristics of the substrate, the properties desired in the release coating, the heat source utilized, and the particular formulation of the release composition. Generally, it is desired to apply the least amount of coating to obtain the desired result. Thus, applied coating weights may range from about 1.3 g/m² to about 1.8 g/m² for most paper and clay coated substrates depending upon holdout and from about 0.65 g/m² to about 1.15 g/m² for poly coated Kraft and film substrates and will vary widely depending on the type of substrate and intended use.

The thermal addition curable solventless silicone release compositions of the invention can be cured by exposure to known forms of heat. In accordance with the invention, the compositions are able to provide general release values for typical end use requirements.

The invention claimed is:

1. A silicone thermal addition curable solventless silicone release coating composition comprising, as a mixture and each component being present in a positive amount:
  (a) up to about 50 parts by weight of a first organopolysiloxane of formula (I) which has a Brookfield viscosity of about 50 cps to about 45,000 cps at room temperature, and wherein n is from about 85 to about 115;

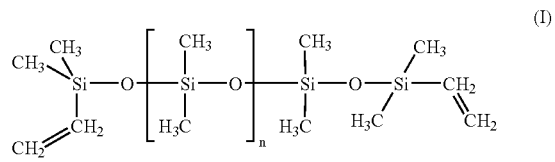

(I)

(b) up to about 25 parts by weight of a second organopolysiloxane of formula (I) having a Brookfield viscosity of about 50,000 cps to about 150,000 cps and n is from about 855 to about 1325;
  (c) up to about 50 parts by weight of a third organopolysiloxane having a formula (II)

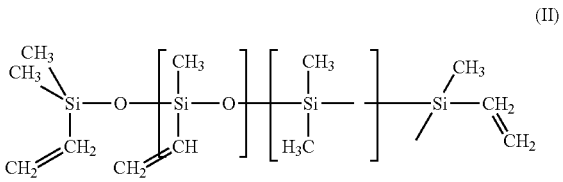

(II)

having a Brookfield viscosity of about 50 cps to about 50,000 cps at room temperature, n' is from about 115 to about 145, and m is from about 1 to about 15;
  (d) up to about 15 parts of an alpha olefin having a general formula of $CH_2=CH-[CH2]_aCH_3$, wherein a is from about 4 to about 20;
  (e) up to about 15 parts of a crosslinkable polymer; and
  (f) up to about 10 parts of a platinum group based catalyst system.

2. The composition of claim 1 wherein the first organopolysiloxane, (a), has a Brookfield viscosity of about 180 cps.

3. The composition of claim 1 wherein in the first organopolysiloxane, (a), formula (I), n is about 97.

4. The composition of claim 1 wherein the second organopolysiloxane, (b), has a Brookfield viscosity of about 100,000 cps.

5. The composition of claim 4 wherein in the second organopolysiloxane, (b), of formula (I), n is about 980.

6. The composition of claim 1 wherein the third organopolysiloxane, (c) has a Brookfield viscosity of about 450 cps.

7. The composition of claim 6 wherein in part (c), formula (II), n' is about 130.

8. The composition of claim 7 wherein in part (c), formula (II), m is about 8.

9. The composition of claim 1 wherein a is 11.

10. The composition of claim 1 wherein the Brookfield viscosity of the first organosiloxane, (a) of formula (I) is about 180 cps, and n is about 97; the Brookfield viscosity of the second organopolysiloxane, (b), of formula (I) is about 100,000 cps, and n is from about 980; wherein the Brookfield viscosity of the third organopolysiloxane, (c), of formula (II) is about 450 cps n' is about 130, and m is about 8; and in alpha olefin, (d), a is about 11.

11. A substrate coated with the coating composition of claim 1.

12. A method for producing a release coating on a substrate comprising: applying a coating of a silicone release coating composition of claim 1 to a substrate; and curing the coating on the substrate by exposing the coating to heat.

13. The composition of claim 1 comprising
   (a) about 35 parts by weight of the first organopolysiloxane wherein the Brookfield viscosity is about 50 cps to about 45,000 cps at room temperature, and n is about 97;
   (b) about 15 parts by weight of the second organopolysiloxane wherein the Brookfield viscosity is about 50,000 cps to about 150,000 cps, and n is about 980;
   (c) about 40 parts by weight of the third organopolysiloxane of formula (II) wherein the Brookfield viscosity is about 50 cps to about 50,000 cps, n is about 120, and m is about 8;
   (d) about 10 parts by weight of the alpha olefin having a general formula of $CH_2=CH-[CH2]_aCH_3$, wherein a is about 11;
   (g) up to about 0.3 weight percent of diallyl maleate as the inhibitor; and
   (f) up to about 10 parts of the platinum group based catalyst system.

14. The composition of claim 13 wherein the first organopolysiloxane, (a), has a Brookfield viscosity of about 180 cps.

15. The composition of claim 13 wherein the second organopolysiloxane, (b), has a Brookfield viscosity of about 100,000 cps.

16. The composition of claim 13 wherein the third organopolysiloxane, (c), has a Brookfield viscosity of about 450 cps.

17. A substrate coated with the coating composition of claim 13.

18. A method for producing a release coating on a substrate comprising: applying a coating of a silicone release coating composition of claim 13 to a substrate; and curing the coating on the substrate by exposing the coating to heat.

* * * * *